June 7, 1960    F. O. ANDERSON    2,939,674
IRRIGATION PIPE VALVE

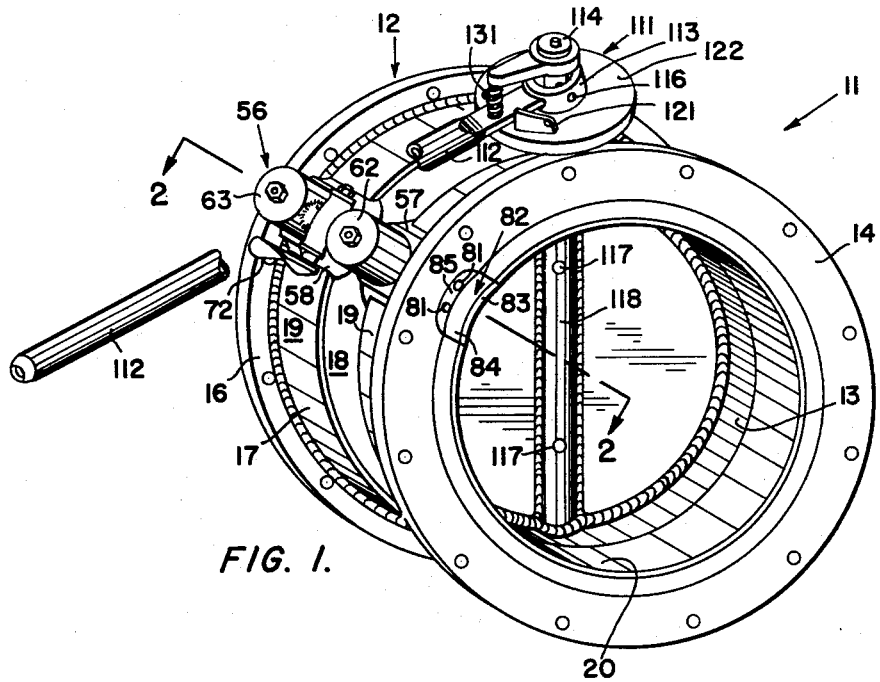

Filed July 29, 1957    2 Sheets-Sheet 2

INVENTOR.
HAZEL F. ANDERSON, ADMINISTRATRIX
OF ESTATE OF FRANK O. ANDERSON, DECEASED
BY
Lothrop & West
ATTORNEYS United States Patent Office 2,939,674
Patented June 7, 1960

2,939,674

IRRIGATION PIPE VALVE

Frank O. Anderson, deceased, late of Clarksburg, Calif., by Hazel F. Anderson, administratrix, Clarksburg, Calif., assignor to Elvin Larson, Clarksburg, Calif.

Filed July 29, 1957, Ser. No. 674,942

1 Claim. (Cl. 251—173)

The invention relates to butterfly valves, and more particularly, to improvements in butterfly valves used in portable irrigation systems.

The prior art contains numerous examples of deformable member disposed around the margin of a butterfly valve disc, the encompassing members being hydraulically urgeable inwardly in a radial direction against the disc to effect tight closure. Many of these valves work successfully for a short time, but rather quickly lose their efficiency when subjected to the hard wear and tear attendant upon their use in actual field operations. Others are rather complex in structure and are costly. Still others are not reliable under the higher water pressures currently being used in extensive portable irrigation systems and thus tend to leak, with consequent wastage of water.

It is therefore an object of the invention to provide a valve which is capable of withstanding great water pressure without leaking.

It is another object of the invention to provide a valve which is durable enough to withstand the hard treatment given to irrigation valves season after season.

It is yet another object of the invention to provide a valve which requires but a minimum of repair and maintenance.

It is still another object of the invention to provide a valve in which both the valve operator and the sealing operator are disposed in close juxtaposition for convenience of use.

It is a further object of the invention to provide a valve in which the sealing member is positively locked against axial dislodging movement.

It is still a further object of the invention to provide a valve sealing mechanism which is highly efficient.

It is another object of the invention to provide a generally improved valve.

Other objects, together with the foregoing, are attained in the embodiment described in the following description and shown in the accompanying drawings in which:

Figure 1 is a perspective, a portion of the valve operating handle being broken away more clearly to reveal the exterior elements of the valve sealing mechanism.

Figure 2 is a section, the plane of section being indicated by the line 2—2 in Figure 1, showing the valve sealing members preparatory to being rendered operative.

Figure 3 is a section comparable to that of Figure 2 but in valve sealing condition.

Figure 5:
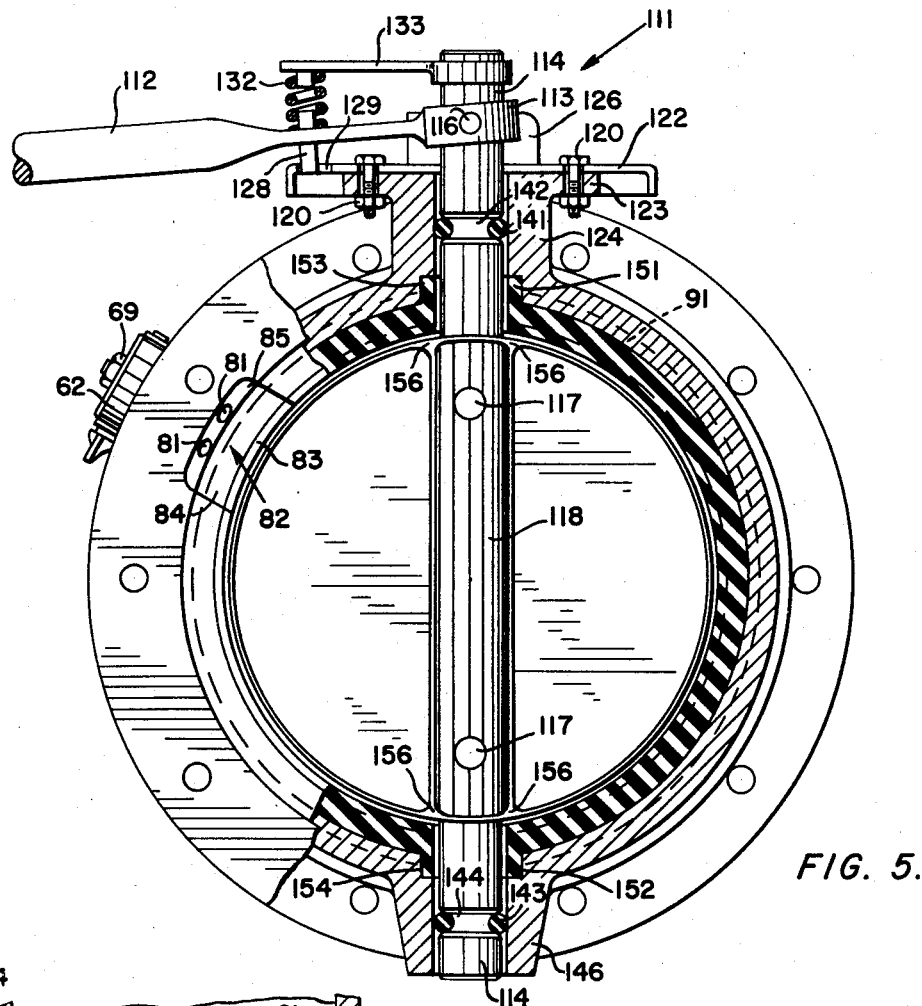
Figure 5 is an end view, portions of the figure being shown in median transverse section more clearly to illustrate the interior structure.

While the valve of the invention is susceptible of numerous physical embodiments, depending on the environment and requirements of use, considerable numbers of the herein shown and described valves have been made and used and have performed in an eminently satisfactory manner.

The valve, generally characterized by the numeral 11, comprises a generally circular cylindrical body 12 encompassing a hollow interior 13 having substantially the same diameter as the irrigation pipe sections with which the valve is utilized. An upstream flange 14 and a downstream flange 16 are provided to integrate the valve in desired fashion into a pipe system, the flanges being attachable, in customary fashion, to mating flanges in adjacent pipe or manifold members.

The valve body 12 includes an outer wall 17 stepped, as shown most clearly in Figure 1, to include a central portion 18 and, for added strength, a pair of thicker side portions 19. The inner wall 20 of the valve body is stepped in a somewhat comparable manner, there being an inwardly projecting central portion 21 offset from the portions 20 and forming therewith a pair of radial shoulders 22 and 23.

Adapted matingly to engage with the shoulders 22 and 23 and disposed in abutting engagement with the inner wall portions 20 and 21 of the valve body is a thick, deformable sleeve 31, or diaphragm, or seal, itself provided with a pair of outwardly extending flanges 32 and 33 and a central inwardly projecting step 34, the step defining an upstream shoulder 36 and a downstream shoulder 37, the shoulders 36 and 37 preferably being somewhat arcuate in contour. As appears most clearly in Figures 2 and 3, the abutment between the valve body shoulders 22 and 23 and the sleeve flanges 32 and 33 positively centers and locks the sleeve, making impossible any axial displacement or dislodgment of the sleeve with respect to the valve body. In assembling the sleeve, in the first instance, the sleeve is warmed slightly to make it more pliable and is thereupon severely distorted as by collapsing it into flat elliptical shape and bending the ends of the ellipse together so that the sleeve can be placed within the valve body. The collapsing force is then withdrawn and the inherent resiliency of the sleeve material causes it to resume its normal generally cylindrical contour and to be placed in the location shown in the drawings.

Augmenting the positive locking effect of the sleeve flanges 32 and 33, and serving, as well, to mold or define the contour of the deformable sleeve as it is subjected to deforming forces is an upstream hoop 41, or ring, or band, and a downstream hoop 42.

Each of the hoops is substantially identical to and is disposed in mirror symmetry with respect to the other. A description of one hoop will therefore serve adequately to describe the other. As appears most clearly in Figure 2, the portion 43 of the hoop 42 adjacent the proximate end of the sleeve is substantially circular cylindrical, the outer diameter of the cylindrical portion 43 being such that substantial force is initially required to seat the hoop into juxtaposed registry with the adjacent sleeve portion. The force, in fact, is so substantial that the sleeve portion 44 interposed between the body wall 20 and the hoop portion 43 is somewhat deformed and therefore exerts a considerable radially inward stress on the hoop portion 43, holding the hoop rigidly in position.

A second hoop portion 46 is tapered or inclined inwardly, the outer wall 47 of the tapered portion 46 being spaced from the adjacent outer wall 48 of the sleeve when the sleeve is in undeformed condition, a generally triangular-in-section chamber 49 being formed thereby. Upon deformation of the sleeve, as appears in Figure 3, the wedge-shaped chamber is progressively closed, the sleeve inner wall 48 being urged into abutment with the adjacent outer wall 47 of the hoop portion 46.

The hoop also includes a third section or portion 51, the portion 51 being curved arcuately inwardly and being abutted in fully deformed condition of the sleeve by the adjacent shoulder 37, or flange, of the central portion 34 of the sleeve, as is shown most clearly in Figure 3.

Figure 4:
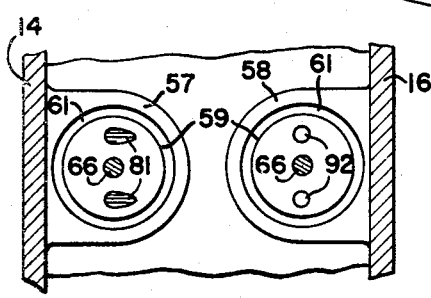
Figure 4 is a section, the plane of section being indicated by the line 4—4 in Figure 2.

Sleeve deformation is effected by a sealing mechanism, or sealing operator, generally characterized by the numeral 56. Formed, as by integrally casting, onto the outer wall of the valve body is a pair of upstanding bosses 57 and 58. Machined into each of the bosses, as appears most clearly in Figures 2 and 4, is an annular groove, or slot 59 having suitable packing material 61 disposed therein to effect a tight seal with the bottom edges of a pair of inverted cups 62 and 63, each of the cups defining a corresponding pair of chambers 64 and 65. Tightening of each of the cups in its seat is effected by a threaded stem 66 in threaded engagement with a radial drilled and tapped hole 67 in the boss. An inner nut 68, preferably provided on its threads and inner face with a sealing compound immediately prior to assembly so that water leakage into the cavity 67 is obviated, tightly locates and holds the stem 66 in position. The cup is thereupon placed in its seat and an outer and similarly leak-proofed nut 69 is taken up so as to clamp the cup against its seat 61 in water tight relation.

Interposed between the cups 62 and 63 is a cock 71 provided with the conventional handle 72, the handle being rotatable so as to align a pair of opposite interior orifices 73 in the hollow cock stem 74 with a pair of passageways 75 and 76 in the cup walls, as shown in Figure 3, or alternatively, into the position illustrated in Figure 2 wherein a cock orifice 77 is aligned with the cup passageway 76 and wherein one only of the orifices 73 is aligned with a vent 78, or bleed port, to the atmosphere.

In order to obtain water at high pressure and lead it into the upstream cup 62, a pair of ports 81 is provided. The upstream end of each of the ports 81 communicates with a chamber 82 formed by excising registering portions 83, 84 and 85 of the adjacent hoop, sleeve and body respectively, all as appears most clearly in Figures 1, 2, 3 and 5. The downstream end of the ports, as shown in Figure 4, enters the chamber 64 on opposite sides of the stem 66.

With high pressure water in the upstream cup chamber 64, rotation of the cock handle to the attitude shown in Figure 3 permits of water flow into the downstream cup chamber 65.

Communication between the downstream cup chamber 65 and an annular cavity 91 circumscribing the sleeve is a pair of substantially radial passageways 92 each terminating in an orifice 93 as it joins the annular cavity 91.

With the sealing operator in the condition shown by Figure 3, water under high pressure is made available at the annular cavity 91, the pressure exerting a radially inward force over the entire perimeter of the adjacent portion of the sleeve, and deforming the sleeve inwardly. As sleeve deformation proceeds, a lens-shape in section chamber 96 is formed, the chamber being slightly larger in extent throughout the portion adjacent the orifices 93 than in the area distant from said orifices, as is illustrated in Figure 3.

Upon creation of the chamber 96, a continuing radially inward force on the central portion of the deformable sleeve obtains, urging the sleeve against the hoops 41 and 42 and the inner sleeve wall 34 into extremely tight radial engagement with the periphery 101 of the circular valve disc 102, the valve disc having been rotated into transverse, closed position prior to actuation of the sealing operator.

With the valve closed and the sealing mechanism in operation, an extremely tight seal, for extended periods, is realized. Temporary surges of extremely high pressures are self-compensating since such surges are communicated through the cup chambers and open passageways from the ports 81 to the lens shaped cavity 96 and exert an even greater force and consequent sealing effect on the sleeve.

When the valve is to be opened, the cock handle 72 is first rotated to the attitude shown in Figure 2. As previously explained, this handle position cuts off communication with the high pressure, upstream fluid and permits bleeding of the fluid in the chamber 96 into the atmosphere through the vent 78, the natural resiliency of the sleeve urging the water out through the ports 93, the chamber 96 closing in a left to right hand direction, as appears in Figure 3 so that entrapment of any water is avoided. After venting, the sleeve assumes the position shown in Figure 2, there being a slight clearance, or no more than a slight interference between the disc margin 101 and the adjacent sleeve wall 34, thus permitting the disc to be rotated to open position very easily.

Disc rotation is effected by appropriate movement of a valve operator, generally designated 111, and comprising a handle 112 mounted on a collar 113 encircling the upper end of a valve disc shaft 114 and rockably mounted thereon on a cross-pin 116 passing through the shaft.

A pair of tapered pins 117 secures the shaft 114 to the facing pair of disc mounting segments 118, the disc being disposed in co-planar relation to the handle 112 so that when the handle is in transverse position, as appears in Figures 1 and 5, the valve disc is likewise in transverse or closed condition. A closed position limit stop 121 is mounted on a plate 122 secured by fastenings 120 to a flange 123 surmounting an upper boss 124 on the valve body, the limit stop 121 indicating even more clearly to the user the proper handle position for valve closure.

An open position limit stop 126 displaced approximately 90° from the closed limit stop 121 indicates opened valve condition.

Locking of the handle in the fully open or fully closed positions is effected by engagement between a stud 128 projecting downwardly from the handle 112 and one or the other of a pair of apertures 129 in the plate 122 adjacent each of the limit stops. Conveniently, an intermediate aperture 131, corresponding to a half-open valve position, is also provided.

When it is desired to shift the valve handle from one position to another the handle 112 is lifted upwardly against the urgency of a compression spring 132 disposed between the handle 112 and a spur 133 mounted on the shaft 114 and extending outwardly therefrom to overlie the handle 112. With the handle lifted far enough for the stud 128 to clear the aperture 129, the handle, and thus the shaft and disc, can be swung either to the other extreme position or to the intermediate location, the handle being thereupon lowered to permit re-engagement between the stud 128 and the appropriate aperture.

The upper boss 124 serves as an upper bearing for the shaft 124, an O-ring 141 being disposed in an annular groove 142 in the shaft to prevent water leakage along the upper portion of the shaft. In comparable fashion, a lower O-ring 143 in a corresponding annular groove 144 obviates loss along the lower portion of the shaft 114, said lower shaft portion being journaled in a lower boss 146 integrally formed with the valve body.

It has heretofore been mentioned that the flanges 32 and 33 on the sleeve as well as the forces exerted by the hoops are extremely effective in the prevention of axial dislodgement of the sleeve. Figure 5 illustrates yet another manner in which sleeve shift is obviated. Projecting outwardly from diametrically opposite sides of the deformable sleeve is an upper collar 151 and a lower collar 152, each disposed, respectively, in an upper recess 153 and a lower recess 154 in the valve body. As valve closure and sealing is effected, the deformable material of the collars 151 and 152 as well as the material adjacent the collar bases come under the influence of the encircling high pressure fluid in the cavity 91 and the chamber 96, the deformation being effective to urge the material inwardly into tight contact with the shaft and adjacent the upper and lower crowns 156 of the shaft segments 118.

It can therefore be seen that a valve has been provided which is not only readily manipulable between open and closed position but which is also extremely water tight in closed position, even under high pressures, and which, furthermore, retains its efficiency for long periods of hard use.

What is claimed is:

In a butterfly valve having a cylindrical body, a cylindrical sleeve within said body, a circular valve disc rotatably mounted on said body and within said sleeve, means for deforming said sleeve radially inwardly into abutment with the margin of said disc in closed position thereof, the combination of a pair of hoops disposed within said sleeve adjacent the ends thereof, each of said hoops including a cylindrical portion and a tapered portion, said cylindrical portion being in tight engagement with said sleeve, said tapered portion being spaced radially from said sleeve in undeformed condition of said sleeve and in contacting relation with said sleeve in deformed condition thereof, each of said hoops being further characterized by an inturned annular lip adapted to engage with an adjacent flange portion on said sleeve in deformed condition of said sleeve.

References Cited in the file of this patent

UNITED STATES PATENTS

| | | |
|---|---|---|
| 1,834,870 | Rogers | Dec. 1, 1931 |
| 1,990,309 | Phillips | Feb. 5, 1935 |
| 2,059,656 | Ring | Nov. 3, 1936 |
| 2,673,708 | Danks | Mar. 30, 1954 |

FOREIGN PATENTS

| | | |
|---|---|---|
| 520,188 | Germany | Mar. 9, 1931 |
| 670,327 | Germany | Jan. 16, 1939 |
| 270,749 | Switzerland | Dec. 16, 1950 |